Jan. 9, 1940.  A. APREA ET AL  2,186,620
ADJUSTABLE SPEED LIMITING DEVICE FOR AUTOMOBILES
Filed Feb. 21, 1938
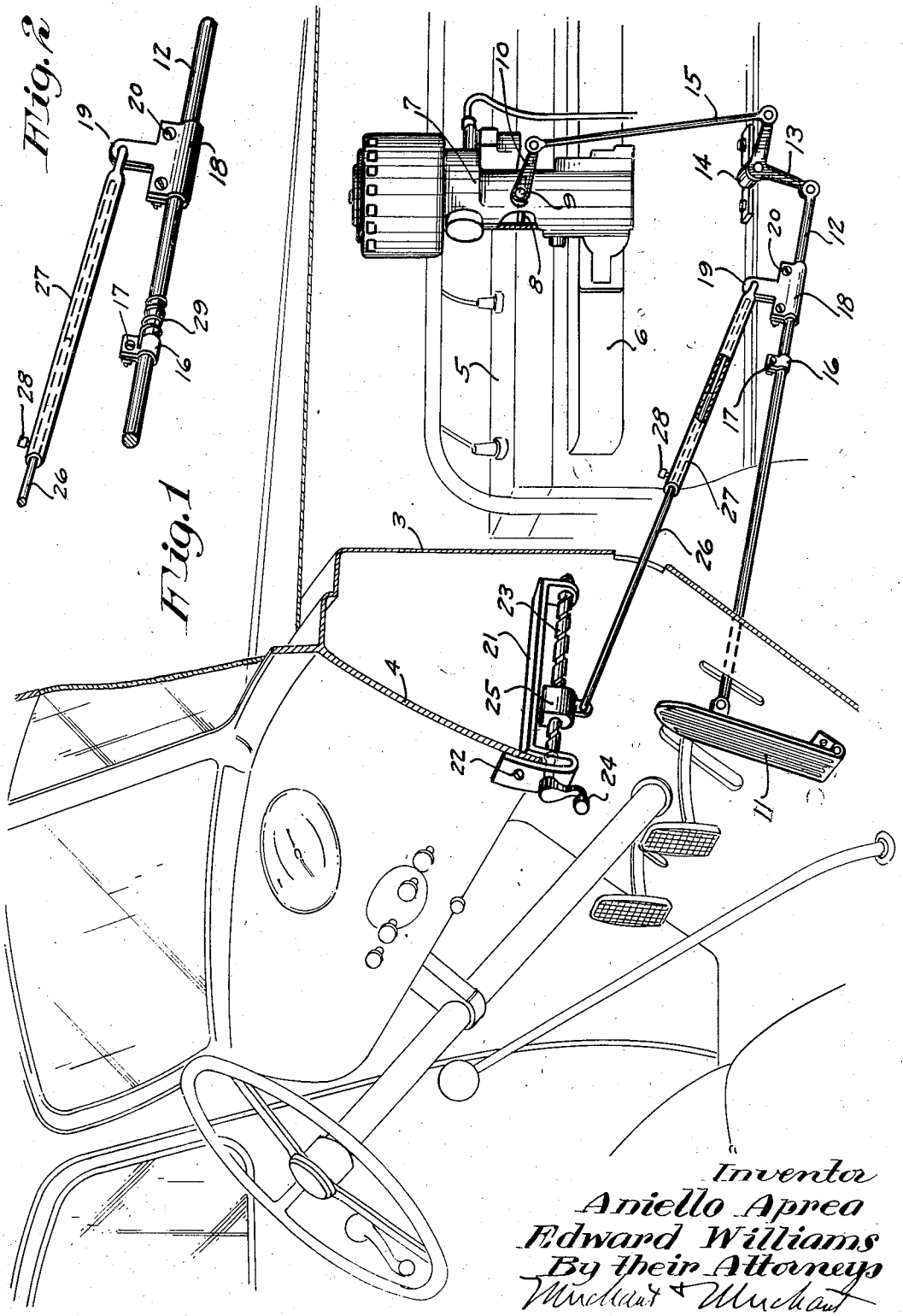
Inventors
Aniello Aprea
Edward Williams
By their Attorneys Patented Jan. 9, 1940

2,186,620

UNITED STATES PATENT OFFICE 2,186,620

ADJUSTABLE SPEED LIMITING DEVICE FOR AUTOMOBILES

Aniello Aprea and Edward Williams, Minneapolis, Minn.

Application February 21, 1938, Serial No. 191,840

3 Claims. (Cl. 74—526)

Our invention relates to machines for controlling or limiting the speed of motor-propelled vehicles and particularly the invention is directed to a simple and efficient attachment for automobiles or motor-propelled vehicles equipped with internal combustion engines controlled by the primary operation of a foot pedal, usually designated as the accelerator.

It is a well known fact that in first starting an automobile a speed such as twenty or thirty miles per hour appears to the driver as quite fast speed, but that as miles are driven, the driver loses to a large degree a sense of speed so that high speed, such as forty or fifty miles per hour appears to be moderate. Otherwise stated, it is a very natural and easy matter for a driver to continually speed up the car so that unless constant attention is given to the speedometer, the various speed limits in the different zones travelled will be exceeded.

Hitherto limiting stops set for a predetermined speed have been provided; but these have very generally been highly objectionable because of the difficulty of changing the speed limit to which the device is set. A further objection has been found in the fact that with the stop device set for a predetermined relatively low speed, it has not been possible in the case of emergency as, for example, when for an instant or short interval higher speed and greater power than that permitted by the stop device is required to get out of the way of another car or to pass another car, to increase the speed and power.

Our invention provides a device which, in the first instance, may, by manipulation of a hand device within easy reach of the driver, quickly set the stop device for any predetermined speed, say for twenty, thirty, forty or fifty miles per hour, for instance, thereby adjusting the speed to the laws of a district travelled. In the second place, in case of emergency as when for a short interval high speed and power is required, that higher speed and power can be produced by an exertion somewhat beyond the normal. In the third place, the device is of low cost and of such character that it is capable of being easily applied to automobiles or motor-propelled vehicles having standard equipment.

The invention is illustrated in the accompanying drawing wherein like characters indicate like parts throughout the several views.

Referring to the drawing:

Fig. 1 is a schematic perspective partly in section illustrating the invention applied to an ordinary automobile equipped with a multi-cylinder engine; and Fig. 2 is a fragmentary perspective illustrating one of the forms of the stop or speed limiting device.

Referring first to the structure illustrated in Fig. 1, only those parts of the automobile that are the customary or usual construction will be particularly noted as follows: the numeral 3 indicates the body including the instrument board 4; the numeral 5 indicates a multi-cylinder internal combustion engine with the usual intake manifold 6. The numeral 7 indicates the customary carburetor connected to the manifold 6 in the customary way and equipped with the usual throttle valve 8, the shaft 9 of which projects and is provided with an arm 10. The numeral 11 indicates the pivoted or hinged accelerator pedal which, by a connecting rod 12, is pivoted to one arm of a bell-crank 13 which, in turn, is pivoted to the motor casing or other suitable support at 14 with its other arm connected by a rod 15 to the arm 10 of the throttle valve. As above indicated, the parts so far indicated by numerals are those of a commercial automobile and with which, by manipulation of the accelerator pedal 11 in the customary way, the speed and power of the engine will be controlled and varied.

Our stop or speed and power limiting device is, in this preferred structure, arranged to operate directly on the connecting rod 12, which rod is provided with and rigidly secured to adjustable stop collar 16 shown as in the form of a split clamp as contracted on the said rod by a small nut-equipped bolt or screw 17. Slidably mounted on the rod 12, between the stop element 16 and the arm of the bell-crank 13, is a stop collar 18 which may take different forms but, as shown, is a sheet metal structure folded upon itself and provided with a projecting arm or lug 19. The flanges or folds of the collar 18 are clamped together by screws or small nut-equipped bolts 20 which leave the collar-forming portion loose for sliding movements on the rod 12.

The manually operated portion of the attachment may be supported in various ways but is preferably directly mounted on a bracket 21 that is rigidly secured to the instrument board 4 by any suitable means such, for example, as one or more machine screws 22. Journaled in the ends of the bracket 21 is a screw-shaft 23 that is held against endwise movements and provided at its front end with an operating crank or hand piece 24 that is within easy reach of the right hand of the driver of the machine. Working on the screw-rod 23 is a nut block 25 that is held against rotation by suitable means such as the overlying portion of the bracket 21. This nut block 25 is connected to the sliding stop collar 18. As shown, this connection is made by a two-part telescopically adjustable connecting rod 26—27 held in set adjustment as to length by suitable means such as a set-screw 28. The rod 26, at its front end, is connected to the depending end of the nut block 25 while the front end of the section 27 is connected to the lug 19 of the sliding collar 18.

With the device described and by adjustments of the stop collar 16 on the rod 12, or by adjustments of the length of the connecting rod 26—27, or by adjustments of both, the device can be set so that opening movement of the throttle valve to a predetermined position may be set or limited. Of course, opening movement of the throttle valve will control the power of the engine, and hence, the speed of the car, assuming that the road conditions are constant.

Obviously, with the nut block 25 set in a predetermined position, movement of the accelerator pedal 11, and hence opening movement of the throttle valve, will be limited whenever the stop collar 16 is engaged with sliding collar 18, the position of which latter is determined by setting of the nut block 25. For varying speeds, the collar 18 can be quickly set in different positions simply by rotation of the crank 24 and resulting movements of the nut block 25 on the screw-rod 23. This kind of an adjustment makes it possible to very easily change the adjustment for different speeds as will be desirable in reaching districts having different speed laws. Also, quick adjustments can be made where more power is required to maintain a predetermined speed going up-hill, or, where less power is required in maintaining a predetermined speed in going downhill.

It is now important to note that the pitch of the screw on rod 23 is approximately 90°. This is done for an important reason. Approximately this indicated pitch will cause sufficient friction between the screw rod and nut block to prevent movements of the latter under ordinary pressure; but such friction will be only such that it may be overcome if very considerable force be applied to the accelerator pedal 11. This permits, by considerable force applied to the pedal 11, to cause the nut block 25 to move and permit the throttle valve to be opened in case greater power or speed is required, for example, in getting out of the way of or passing another automobile.

In Fig. 2, as an important feature, a yielding preliminary stop device is applied between the positive acting stop elements 16 and 18. This preliminary stop device may take different forms but, as shown, is in the form of a coiled spring 29 placed around the rod 12 between the said stop elements 16 and 18. The tension of this spring or yielding stop device 29 should be such that it will not be compressed to any appreciable extent under normal foot actions on the accelerator pedal 11, and hence, will, when it is engaged between the elements 16 and 18, ordinarily act as a stop to limit the speed or power. However, in case of an emergency by such greater force as may be readily applied to the pedal 11, spring 29 will be compressed, thereby permitting the throttle valve to be opened for additional power and speed. Where the spring 29 or yielding preliminary stop device is incorporated, it would be advisable to make the threads of the screw-rod 23 less in pitch so that the nut block 25 would be more firmly set and capable of being moved only by rotation of the screw-rod.

What we claim is:

1. The combination with a speed controlling element and means for actuating the same including a pedal and an endwise movable thrust rod connected to and extending from said pedal, of cooperating stops, one slidable on and the other relatively fixed to said thrust rod, a block, a guide supporting said block for endwise traveling movements, and a connecting rod connecting said block to the sliding stop on said thrust rod.

2. The structure defined in claim 1 in which said connecting rod is made up of two sections connected for axial adjustment to vary the distance between said block and the movable element on said thrust bar.

3. The structure defined in claim 1 in which a spring is interposed between the relatively movable and fixed stop elements on the said thrust rod, said spring having a limited stop action capable of being overcome by force applied to said pedal.

ANIELLO APREA.
EDWARD WILLIAMS.